(12) United States Patent
Goehlich et al.

(10) Patent No.: US 9,073,621 B2
(45) Date of Patent: Jul. 7, 2015

(54) AIRCRAFT COMPRISING AN INSULATION SYSTEM FOR THERMAL AND ACOUSTIC INSULATION

(75) Inventors: Robert Alexander Goehlich, Hamburg (DE); Steffen Biesek, Hamburg (DE); Cihangir Sayilgan, Hamburg (DE)

(73) Assignee: Airbus Operations GmbH (DE)

( * ) Notice: Subject to any disclaimer, the term of this patent is extended or adjusted under 35 U.S.C. 154(b) by 950 days.

(21) Appl. No.: 13/258,786

(22) PCT Filed: Feb. 23, 2010

(86) PCT No.: PCT/EP2010/052294
§ 371 (c)(1),
(2), (4) Date: Oct. 7, 2011

(87) PCT Pub. No.: WO2010/112270
PCT Pub. Date: Oct. 7, 2010

(65) Prior Publication Data
US 2012/0012698 A1    Jan. 19, 2012

Related U.S. Application Data

(60) Provisional application No. 61/164,576, filed on Mar. 30, 2009.

(30) Foreign Application Priority Data

Mar. 30, 2009  (DE) .......................... 10 2009 015 590

(51) Int. Cl.
*B64C 1/40*    (2006.01)
*F16L 55/033*  (2006.01)
*F16L 59/02*   (2006.01)
*F16L 59/147*  (2006.01)
*B64D 11/00*   (2006.01)

(52) U.S. Cl.
CPC ............. B64C 1/40 (2013.01); *Y10T 29/49826* (2015.01); *B64D 2011/0046* (2013.01); F16L 55/033 (2013.01); F16L 59/027 (2013.01); F16L 59/147 (2013.01)

(58) Field of Classification Search
USPC ........................................ 244/1 N, 119, 133
See application file for complete search history.

(56) References Cited

U.S. PATENT DOCUMENTS

| 2,362,951 | A | * | 11/1944 | Wallis | 52/249 |
| 2,540,331 | A | * | 2/1951 | Hlavaty | 454/185 |
| 3,867,244 | A |  | 2/1975 | Adams |  |
| 4,291,851 | A |  | 9/1981 | Johnson |  |
| 2005/0211838 | A1 |  | 9/2005 | Struve et al. |  |

(Continued)

FOREIGN PATENT DOCUMENTS

DE           1605884 A1     8/1970
DE     102005016653 A1    10/2006

(Continued)

*Primary Examiner* — Rob Swiatek
(74) *Attorney, Agent, or Firm* — Lerner, David, Littenberg, Krumholz & Mentlik, LLP

(57) ABSTRACT

An aircraft includes an insulation system for thermal and acoustic insulation. The insulation system includes a cabin, an outer skin, a sound insulating unit, and a heat insulating unit. The sound insulating unit is designed to acoustically insulate the aircraft. The heat insulating unit is designed to thermally insulate the aircraft. The sound insulating unit and the heat insulating unit are arranged between the cabin and the outer skin.

12 Claims, 2 Drawing Sheets

(56) References Cited

U.S. PATENT DOCUMENTS

2006/0222837 A1* 10/2006 Kismarton ............. 428/297.4
2010/0148001 A1   6/2010 Hoetzeldt et al.

FOREIGN PATENT DOCUMENTS

| DE | 102005016654 A1 | 10/2006 |
|---|---|---|
| DE | 102006023209 A1 | 11/2007 |
| DE | 102007008986 A1 | 8/2008 |
| DE | 102008063923 A1 | 6/2010 |
| DE | 102008062701 A1 | 7/2010 |
| FR | 1022731 A | 3/1953 |
| GB | 1172133 A | 11/1969 |
| WO | 2005095206 A1 | 10/2005 |
| WO | 2007131583 A1 | 11/2007 |
| WO | 2008101986 A1 | 8/2008 |

* cited by examiner

AIRCRAFT COMPRISING AN INSULATION SYSTEM FOR THERMAL AND ACOUSTIC INSULATION

CROSS-REFERENCE TO RELATED APPLICATIONS

This application is a national phase entry under 35 U.S.C. §371 of International Application No. PCT/EP2010/052294, filed Feb. 23, 2010, published in German, which claims the benefit of the filing date of U.S. Provisional Patent Application No. 61/164,576, filed Mar. 30, 2009, and of German Patent Application No. 10 2009 015 590.2, filed Mar. 30, 2009, the entire disclosures of which are hereby incorporated herein by reference.

FIELD OF THE INVENTION

The invention relates to insulation systems for thermal insulation and acoustic insulation. In particular, the invention relates to an aircraft comprising an insulation system for thermal insulation and acoustic insulation. Furthermore, the invention relates to a method for thermal insulation and acoustic insulation of an aircraft.

BACKGROUND TO THE INVENTION

Conventional insulation arrangements in an aircraft comprise a cotton-wool-like insulation material that is weld-sealed into foil or film. Weld-sealing protects the insulation material against wetness. Without the weld-sealing foil or film, the insulation material would soak up water, which would result in a very substantial increase in weight.

The insulation is installed in the fuselage of the aircraft before the cabin and the other systems are installed. To ensure that the insulation matches the structure of the aircraft, at many positions complicated shapes need to be weld-sealed (for example on the windows, doors, etc.). For subsequent installation of the systems the corresponding retainers need to be accessible, in other words need to project through the insulation. To this effect openings in the foil or film are provided, through which openings the retainer can then be reached. These openings subsequently need to be closed off elaborately with adhesive material, for example to prevent moisture (condensed water etc.) from reaching the insulation material or the structures situated behind it.

From DE 10 2006 023 299 A1 and WO 2007/131583 A1 an acoustic insulation arrangement on an aircraft fuselage structure is known.

DE 10 2007 008 986 A1 and WO 2008/101986 A1 show a fuselage of an aircraft or spacecraft with at least one shell element and a structural element and a ventilated space between the shell element and the structural element.

SUMMARY OF THE INVENTION

It can be considered an object of the invention to state thermal insulation and acoustic insulation in a transportation means, which thermal insulation and acoustic insulation is simple and flexible in use.

Stated are an aircraft with an insulation system for thermal insulation and acoustic insulation, as well as a method for thermal insulation and acoustic insulation of an aircraft according to the characteristics of the independent claims. Further embodiments of the invention are embodied by the dependent claims.

According to an exemplary embodiment of the invention, stated are an aircraft with an insulation system for thermal insulation and acoustic insulation with a cabin, an outer skin, an acoustic insulation unit and a thermal insulation unit. The acoustic insulation unit is designed for acoustically insulating the aircraft; the thermal insulation unit is designed for thermally insulating the aircraft; and the acoustic insulation unit and the thermal insulation unit are arranged between the cabin and the outer skin.

Such an aircraft with an insulation system makes it possible to simplify manufacture and installation of the thermal and acoustic insulation and to shorten the work time when compared to the manufacture and installation of integrated acoustic and thermal insulation made in one piece.

Such an insulation system is associated with an advantage in that the insulation expenditure can be reduced in that the tasks of acoustic insulation and thermal insulation are split up to be handled by separate components that are optimally designed, namely by the acoustic insulation unit and the thermal insulation unit. It is a prerequisite for the cabin to be installed as an entity in the fuselage.

The thermal insulation unit of the insulation system of the aircraft comprises, for example, a coarsely-textured woven material with a coarse fiber pattern that can prevent the formation of capillaries and thus the soaking-up of water as a result of contact with water (capillary action). Thus there is no need for the thermal insulation unit to be weld-sealed.

Such an insulation system makes it possible, even for aircraft of a carbon fiber plastic construction (CFRP construction) to only require one acoustic insulation unit and one thermal insulation unit.

Such an insulation system in the aircraft makes it possible for the woven material of the thermal insulation unit in the above-floor region, in other words in the upper region of the cabin, to be able to be attached to the cabin outside the fuselage. Wherever there are windows, doors, retainers etc. the thermal insulation can simply be separated, without the need, for example, for subsequent repair work.

In this arrangement the acoustic insulation unit of the insulation system of the aircraft can be designed as a sound-absorbing component and can be attached over a large area to the outer skin of the fuselage.

The acoustic insulation unit of the insulation system of the aircraft can be formed like the sound-absorbing walls of a sound studio. As a result of the sound-absorbing geometry and the material of the acoustic insulation unit, sound can be absorbed.

Such an insulation system of an aircraft makes possible improved thermal and acoustic insulation by separating the tasks of thermal insulation and acoustic insulation to an acoustic insulation unit and a thermal insulation unit, and by the use of suitable materials and designs relating to the thermal insulation unit and the acoustic insulation unit.

The insulation system of the aircraft provides an advantage in that simple manufacture of the insulation, namely of the acoustic insulation unit and of the thermal insulation unit, is made possible because it is no longer necessary to weld-seal the thermal insulation unit. Manufacturing thermal insulation can take place in a manner similar to manufacturing a carpet, and thermal insulation can be produced as piece goods because in contrast to the weld-sealed thermal insulation unit no complicated shapes need to be taken into account during manufacture.

Furthermore, such an insulation system of an aircraft allows simple installation when compared to that of a weld-sealed thermal insulation unit, because it requires no repair work on a weld-seal film or foil, and because the thermal insulation can be attached to the cabin from outside the fuselage.

By means of such an insulation system of an aircraft savings in time and expenditure can be achieved because of the simple manufacture and the quick installation of the insulation system when compared to the manufacture and installation of weld-sealed thermal insulation.

Such an insulation system of an aircraft furthermore comprises an advantage in that by splitting the tasks of thermal insulation and acoustic insulation an improvement in the quality can be achieved.

According to a further exemplary embodiment of the invention, the acoustic insulation is attached to the outer skin of the aircraft, wherein the thermal insulation unit is attached to the cabin of the aircraft.

According to a further exemplary embodiment, the acoustic insulation is bonded from the inside to the outer skin of the aircraft, and the thermal insulation unit is in place in the manner of a fishing net over the cabin.

According to a further exemplary embodiment of the invention, there is an air gap between the outer skin and the cabin.

According to a further exemplary embodiment of the invention, there is an air gap between the thermal insulation unit and the acoustic insulation unit.

According to a further exemplary embodiment of the invention, the acoustic insulation unit is attached to a first side of the cabin, and the thermal insulation unit is attached to a second side of the cabin.

According to a further exemplary embodiment of the invention, the acoustic insulation unit is attached to the thermal insulation unit, wherein the combination comprising the acoustic insulation unit and the thermal insulation unit is attached to the cabin. In other words, this means that the acoustic insulation unit can, for example, be attached to the thermal insulation unit, and thereafter the two connected insulation units can be attached to the cabin. The two connected insulation units can, for example, be attached in the interior of the cabin in the region between the cabin and the outer skin or on the part of the cabin facing away from the outer skin.

According to a further exemplary embodiment of the invention, the acoustic insulation unit and the thermal insulation unit are attached to each other on the outer skin. In other words, this means that the acoustic insulation unit can be attached to the thermal insulation unit, and the two connected insulation units can be attached to the outer skin in a region between the cabin and the outer skin.

According to a further exemplary embodiment of the invention, the acoustic insulation unit is attached to the outer skin from the inside by means of bonding.

According to a further exemplary embodiment of the invention, the acoustic insulation unit is formed from a sound absorbing material from the group comprising foam rubber, rubber, polystyrene, a sound-absorbing plastic material, a sound-absorbing natural material, etc.

According to a further exemplary embodiment of the invention, the thermal insulation unit is formed from a coarsely-textured woven material with a coarse fiber pattern in order to avoid the formation of capillaries, thus preventing the thermal insulation unit from soaking up water.

According to a further exemplary embodiment of the invention, the thermal insulation unit comprises a multitude of strips and a connecting strip, wherein the connecting strip is designed to affix the strips.

According to a further exemplary embodiment of the invention, the strips are arranged so as to be perpendicular to the connecting strip.

According to a further exemplary embodiment of the invention, the strips are affixed to the connecting strip so as to be regularly spaced apart.

The strips can be affixed to the connecting strips by bonding or welding them into place.

According to a further exemplary embodiment of the invention, the strips and the connecting strips of the thermal insulation unit are attached to the outer skin of the aircraft by bonding and/or hooking them into place.

According to a further exemplary embodiment of the invention, the strips are formed from a material from a group comprising plastic, natural material, polyurethane, polycarbonate, foamed material, glass fiber, glass wool, polyamide, glass-fiber-reinforced plastic (GRP), wherein the connecting strip is formed from a material from the group comprising plastic, natural material, polyurethane, polycarbonate, foamed material, glass fiber, glass wool, polyamide, glass-fiber-reinforced plastic (GRP).

According to a further exemplary embodiment of the invention, the thermal insulation unit is designed to be separated without this causing fraying of the thermal insulation unit. Separation or ripping without fraying the thermal insulation unit is made possible in that the strips of the thermal insulation unit are not damaged during separation, but instead are only displaced. Cutting to size the woven material of the thermal insulation unit can take place at the connecting strips so that the stability of the woven material is not reduced or that fraying of the woven material during cutting to size can be prevented.

According to a further exemplary embodiment of the invention, a method for thermal insulation and acoustic insulation of an aircraft is stated with a first step for attaching an acoustic insulation unit and a thermal insulation unit between a cabin and an outer skin of the aircraft.

According to a further exemplary embodiment of the invention, the method furthermore involves attaching an acoustic insulation unit to the outer skin of the aircraft, and attaching a thermal insulation unit to the cabin of the aircraft.

According to a further exemplary embodiment of the invention, the method further comprises inserting the cabin in an aircraft fuselage, and drilling or cutting through the thermal insulation unit at predetermined locations for the passing-through of retainers or other installations for the cabin.

The individual features of the various exemplary embodiments can also be combined, as a result of which, in part, advantageous effects may arise which exceed the sum of the individual effects, even if these effects are not expressly described.

It should be noted in particular that the characteristics described presently and below with regard to the aircraft with the insulation system can also be implemented in the method and vice versa.

These and other aspects of the invention are explained and illustrated with reference to the exemplary embodiments described below.

DETAILED DESCRIPTION OF EXEMPLARY EMBODIMENTS

Figure 1:
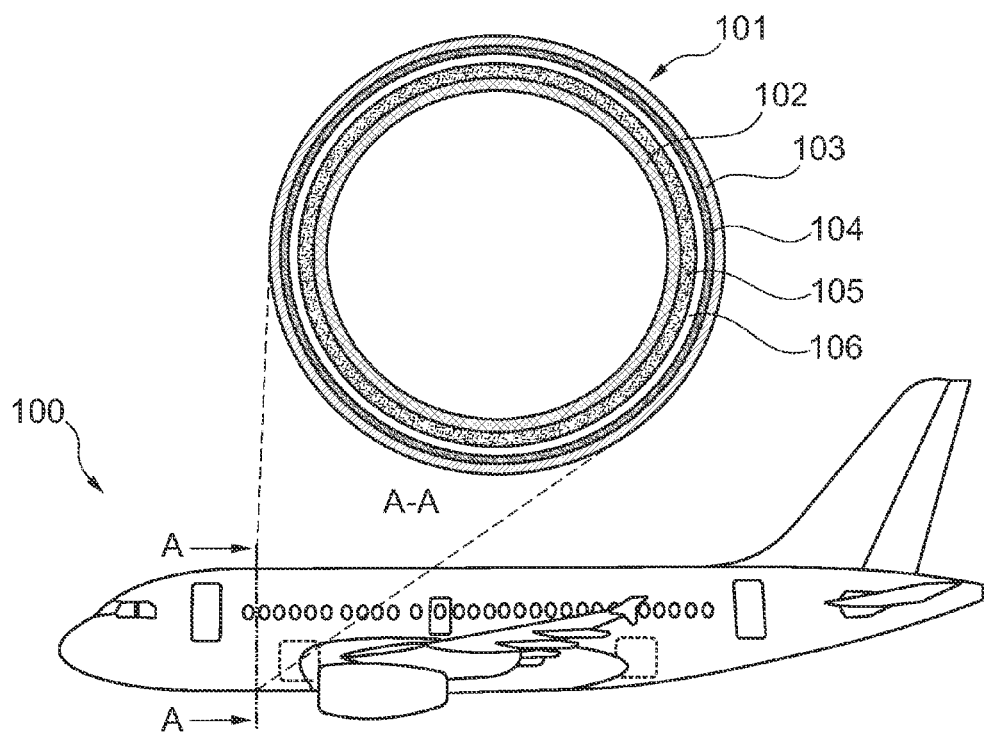
FIG. 1 shows an aircraft with an insulation system for thermal insulation and acoustic insulation according to an exemplary embodiment of the invention.

Below, exemplary embodiments of the invention are described with reference to the enclosed figures.

The illustrations in the figures are diagrammatic and not to scale. In the following description of the figures the same reference characters are used for identical or similar elements.

FIG. 1 shows a lateral view of an aircraft 100 with a section line A-A across the aircraft fuselage.

According to the section line A-A, FIG. 1 further shows a cross section A-A of an insulation system 101 of circular shape.

The insulation system 101 comprises a circular cabin 102, arranged on the inside; a thermal insulation unit 105 arranged on the outside of the aforesaid when viewed from the centre of the circular insulation system 101; an adjoining air gap 106; and an adjoining acoustic insulation unit 104 that is attached to a circular outer skin 103 of the aircraft 100.

The acoustic insulation unit 104 is designed for acoustically insulating the aircraft 100. The thermal insulation unit 105 is designed for thermally insulating the aircraft 100.

Figures 2A, 2B:
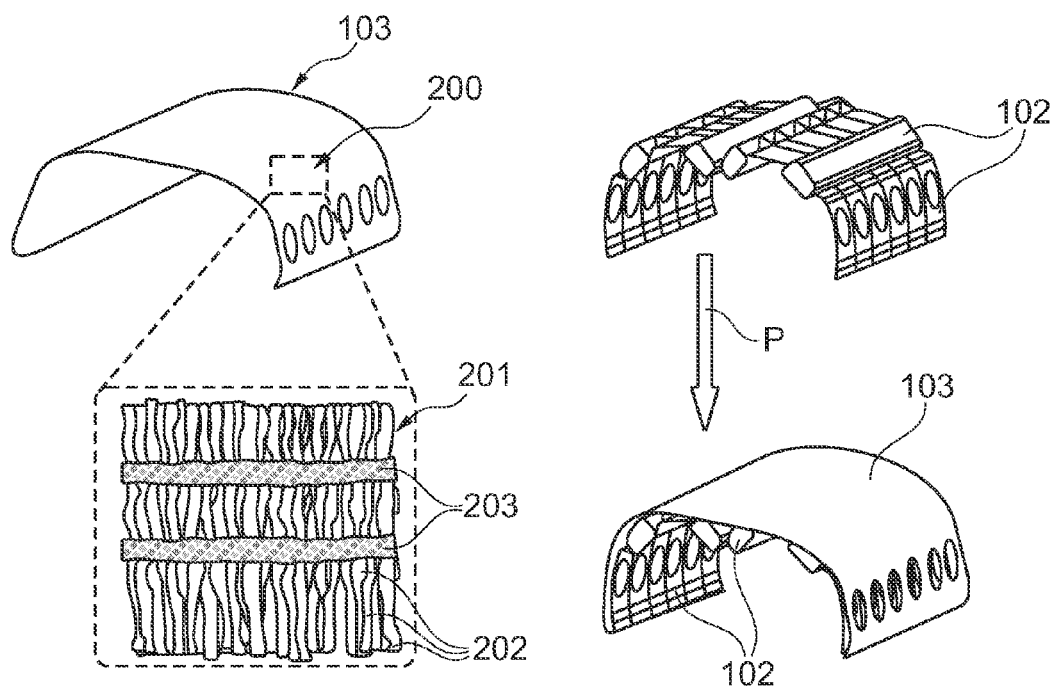
FIG. 2a shows an outer skin with a thermal insulation unit in the form of a woven material according to an exemplary embodiment of the invention.
FIG. 2b shows the outer skin with the thermal insulation unit of FIG. 2a and a single cabin, arranged on the outer skin, according to an exemplary embodiment of the invention.

FIG. 2a shows part of an outer skin 103 of an aircraft with a section 200, shown in an enlarged view. The enlarged section shows a coarsely structured woven material 201 that represents a thermal insulation unit with a coarse fiber pattern. The woven material 201 is designed to avoid the formation of capillaries, thus preventing the thermal insulation unit 105 from soaking up water.

The woven material 201 or the thermal insulation unit comprises a multitude of strips 202 that are, for example, arranged so as to be essentially at a right angle to, for example, two connecting strips 203 and essentially parallel to each other, wherein the strips 202 have been sewn to the connecting strips 203, and thus the connecting strips 203 affix the strips 202.

The strips 202 and the connecting strips 203 can be formed from a plastic or a natural material. The strips 202 can be affixed to the connecting strip 203 by means of bonding or welding them into place.

The strips 202 or the connecting strips 203 can be attached to the outer skin 103 by bonding or hooking them into place. Thus the woven material 201 can be fixed to the outer skin 103 by bonding or hooking it into place.

Cutting the woven material 201 to size in the case of the connecting strip 203 can take place without the stability of the woven material 201 being destroyed, or so that fraying of the woven material when cutting it to size can be prevented.

FIG. 2b shows a cabin 102 and in the direction of the arrow P, spaced apart from it by approximately one length of the arrow, a cabin 102 that is installed on the part of the outer skin 103 of FIG. 2a with the coarsely-textured woven material 201 that acts as a thermal insulation unit.

The thermal insulation unit or the woven material 201 is affixed to the cabin in that it is unrolled over the outer skin 103 of the cabin 102, wherein in this process it falls down to the height of a floor on which the cabin 102 rests.

Figure 3:
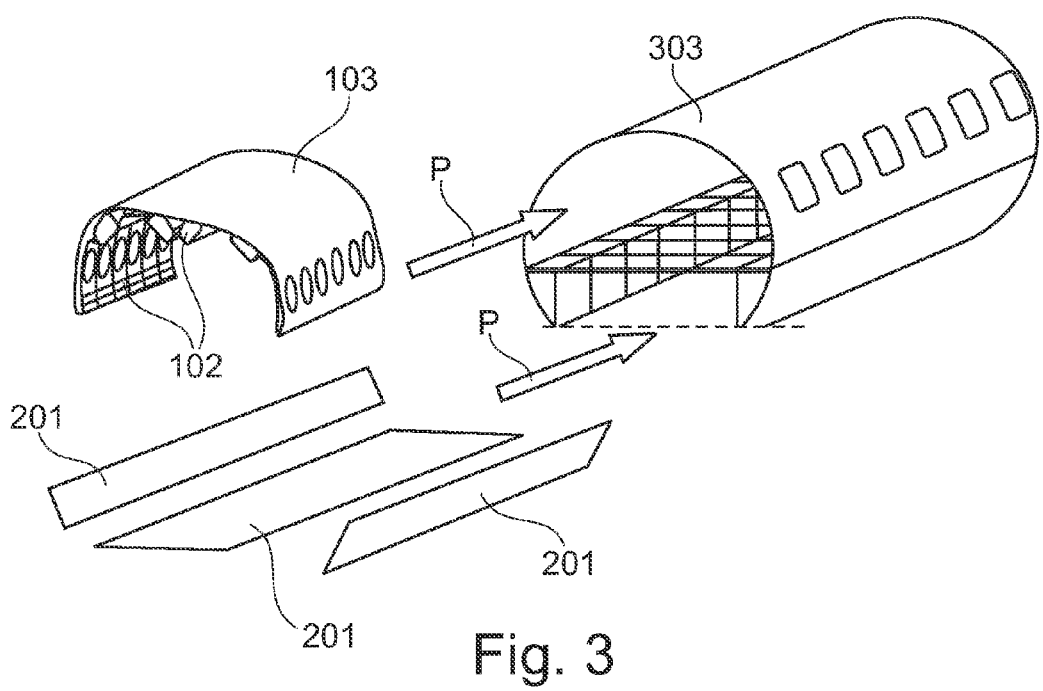
FIG. 3 shows a segment of an outer skin with a cabin and woven material surfaces of thermal insulation units and an aircraft fuselage segment according to an exemplary embodiment of the invention.

FIG. 3 shows part of an outer skin 103 with a cabin 102 that is affixed to the part of the outer skin 103, and three woven material surfaces 201 that act as thermal insulation units. The part of the outer skin 103, which part comprises the cabin segments 102, and the woven material surfaces 201 can be installed to form a thermally-insulated outer skin 303. The thermally-insulated outer skin 303 is arranged in the direction of the arrows P, spaced apart from the part of the outer skin 103 by approximately one length of the arrow.

Figure 4:
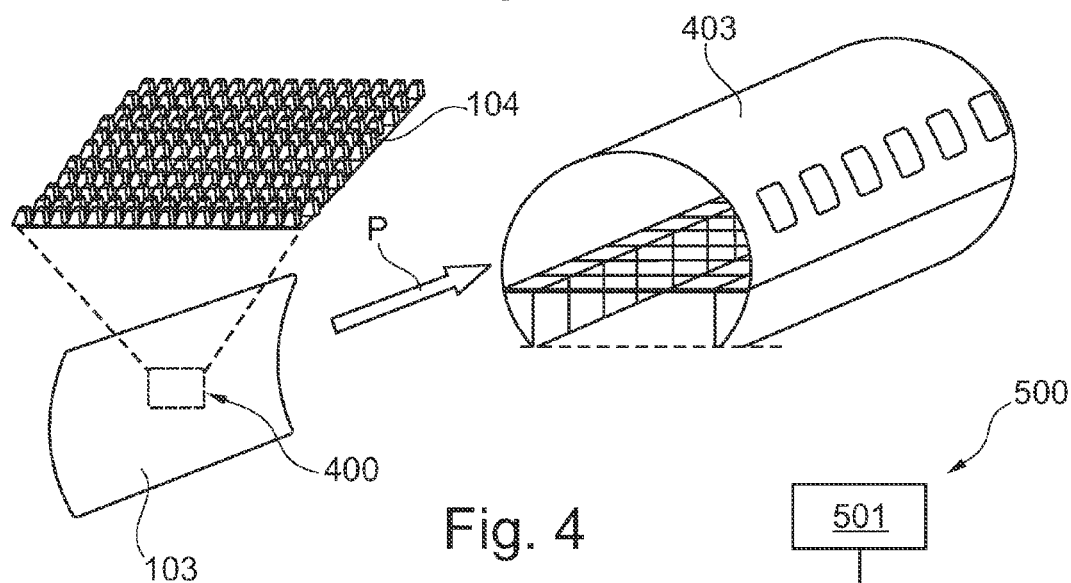
FIG. 4 shows an outer skin with an acoustic insulation unit and an aircraft fuselage segment according to an exemplary embodiment of the invention.

FIG. 4 shows part of an outer skin 103 with a section 400 shown in an enlarged view. The enlarged section 400 shows an acoustic insulation unit 104 comprising an undulating geometry for absorbing sound, which acoustic insulation unit 104 has been attached to part of the outer skin 103. In this arrangement the acoustic insulation unit 104 can, for example, comprise the width of a frame element, and is attached to the outer skin 103 from the inside, for example by means of bonding.

The part of the outer skin 103 can be assembled, for example by means of bonding, with further parts of an outer skin to form an acoustically insulated outer skin 403 that is arranged in the direction of the arrows P, spaced apart from the part of the outer skin 103 by approximately one length of the arrow.

Figure 5:
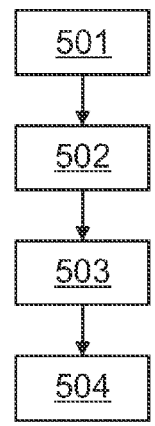
FIG. 5 shows a flow chart of a method for thermal insulation and acoustic insulation of an aircraft according to an exemplary embodiment of the invention.

FIG. 5 shows a flow chart of a method 500 for thermal insulation and acoustic insulation of an aircraft, with the method involving the following steps: a first step 501 involves attaching the acoustic insulation unit to the outer skin of the aircraft. A further step 502 involves attaching the thermal insulation unit to the cabin of the aircraft. In step 503 the cabin is inserted into an aircraft fuselage. Step 504 involves drilling or cutting through the thermal insulation unit at predetermined locations for the passing-through of retainers or other installations for the cabin.

Although the invention has been described with reference to the exemplary embodiments, various alterations and modifications can be carried out without leaving the scope of protection of the invention. An insulation system for thermal insulation and acoustic insulation can be used in aircraft and in any other transportation means.

In addition, it should be pointed out that "comprising" does not exclude other elements or steps, and "a" or "one" does not exclude a plural number. In particular, the aircraft comprising an insulation system can, for example, comprise more than one cabin, more than one outer skin, more than one acoustic insulation unit, more than one thermal insulation unit, more than one air gap; and the thermal insulation unit can comprise more than one strip and more than one connecting strip.

Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft with an insulation system for thermal insulation and acoustic insulation, with the aircraft comprising:
   a cabin;
   an outer skin;
   an acoustic insulation unit;
   a thermal insulation unit;

wherein the acoustic insulation unit is configured for acoustically insulating the aircraft;

wherein the thermal insulation unit is configured for thermally insulating the aircraft;

wherein the acoustic insulation unit and the thermal insulation unit are arranged between the cabin and the outer skin, and wherein the thermal insulation unit is formed from a coarsely-textured woven material with a coarse fiber pattern thereby preventing the thermal insulation unit from soaking up water and comprises a plurality of strips and a connecting strip, wherein the connecting strip is adapted to affix the strips.

2. The aircraft of claim 1, wherein the acoustic insulation unit is attached to the outer skin of the aircraft; and wherein the thermal insulation unit is attached to the cabin of the aircraft.

3. The aircraft of claim 1, wherein there is an air gap between the outer skin and the cabin.

4. The aircraft of claim 1, wherein the acoustic insulation unit is attached to the thermal insulation unit; and wherein the combination comprising the acoustic insulation unit and the thermal insulation unit is attached to the cabin.

5. The aircraft of claim 1, wherein the acoustic insulation unit and the thermal insulation unit are attached to each other and to the outer skin.

6. The aircraft of claim 1, wherein the acoustic insulation unit is formed from a sound absorbing material selected from a group consisting of foam rubber, rubber, polystyrene, a sound-absorbing plastic material and a sound-absorbing natural material.

7. The aircraft of claim 1, wherein the strips are arranged so as to be perpendicular to the connecting strip.

8. The aircraft of claim 1, wherein the strips are affixed to the connecting strip so as to be regularly spaced apart.

9. The aircraft of claim 1, wherein the strips are formed from a material selected from a group consisting of plastic, natural material, polyurethane, polycarbonate, foamed material, glass fiber, glass wool, polyamide, and glass-fiber-reinforced plastic (GRP); and wherein the connecting strip is formed from a material selected from a group comprising plastic, natural material, polyurethane, polycarbonate, foamed material, glass fiber, glass wool, polyamide, and glass-fiber-reinforced plastic (GRP).

10. The aircraft of claim 1, wherein the thermal insulation unit is adapted to be separated without this causing fraying of the thermal insulation unit.

11. A method for thermal insulation and acoustic insulation of an aircraft, with the method comprising the step of:

attaching an acoustic insulation unit and a thermal insulation unit between a cabin and an outer skin of the aircraft, wherein the thermal insulation unit is formed from a coarsely-textured woven material with a coarse fiber pattern thereby preventing the thermal insulation unit from soaking up water and comprises a plurality of strips and a connecting strip, wherein the connecting strip is adapted to affix the strips.

12. The method of claim 11, further comprising the steps of:

attaching the acoustic insulation unit to the outer skin of the aircraft; and attaching the thermal insulation unit to the cabin of the aircraft.

* * * * *